L. TABULO.
BLOCK OR HOISTING GEAR.
APPLICATION FILED JUNE 25, 1910.
1,014,728.
Patented Jan. 16, 1912.
2 SHEETS—SHEET 1.
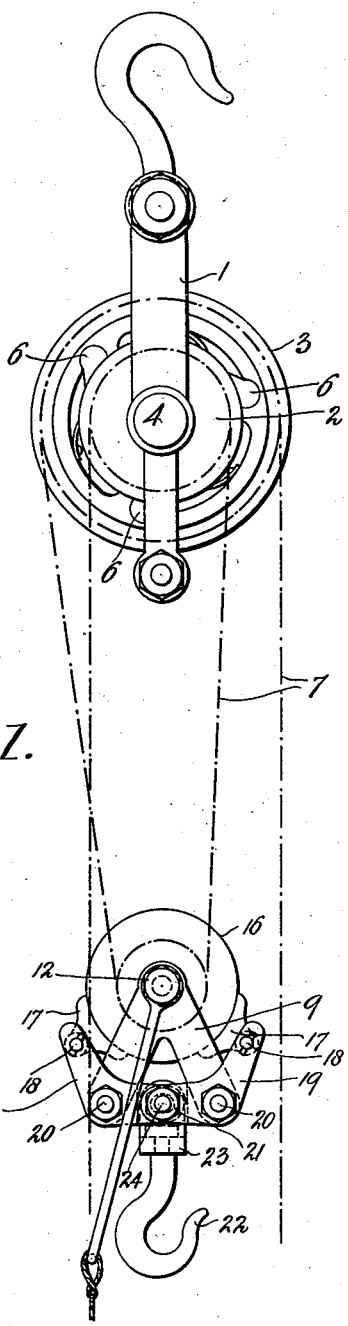
Fig. 1.
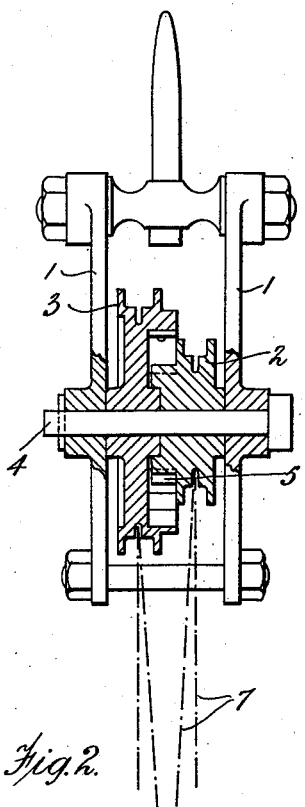
Fig. 2.
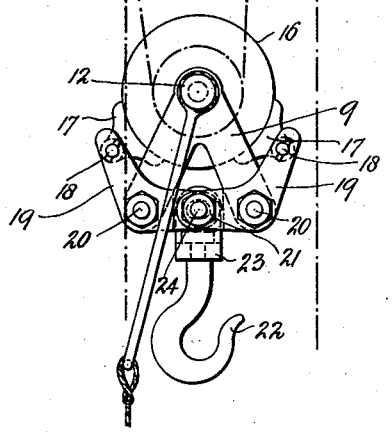
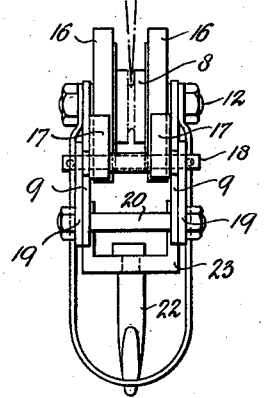
WITNESSES
W. P. Burk
Lawrence Najek
INVENTOR
Louis Tabulo
BY Wm. McCaw Witt
ATTY.

L. TABULO.
BLOCK OR HOISTING GEAR.
APPLICATION FILED JUNE 25, 1910.

1,014,728.

Patented Jan. 16, 1912.
2 SHEETS—SHEET 2.

WITNESSES
W. P. Burk
Lawrence Najek

INVENTOR
Louis Tabulo
ATTY.

UNITED STATES PATENT OFFICE.

LOUIS TABULO, OF LONDON, ENGLAND.

BLOCK OR HOISTING-GEAR.

1,014,728.  Specification of Letters Patent.  Patented Jan. 16, 1912.

Application filed June 25, 1910. Serial No. 568,875.

*To all whom it may concern:*

Be it known that I, LOUIS TABULO, a subject of the Emperor of Austria-Hungary, residing at 22 Valmar road, Denmark Hill, London, S. E., England, have invented certain new and useful Improvements in Blocks or Hoisting-Gear, of which the following is a specification.

This invention relates to differential hoisting and lowering apparatus and has been devised with the object of providing said apparatus with a lower pulley block which shall be self-sustaining, with the result that the chain wheels or pulleys in the upper block of the apparatus can be made of diameters differing considerably from one another.

According to the invention the hanging pulley of the lower block of a differential hoisting and lowering apparatus is made with pockets which fit the chain or is otherwise formed so as to be gripped by the chain. Said hanging pulley is loosely mounted on a bolt fixed to the frame of the block and is provided at its sides with ratchet wheels. A brake wheel is loosely mounted on said bolt at each side of the hanging pulley and these brake wheels are provided with pawls which are adapted to engage with the teeth of the ratchet wheels carried by the hanging pulley. A pair of bell crank levers are pivoted by means of bolts to the frame of the block and are provided at their outer and upper ends with brake blocks which are pivotally supported on said levers by means of pins and are adapted to bear against the peripheries of the brake wheels. The inner ends of the bell crank levers are slotted and the hook on which the load is hung is mounted in a shackle which is connected to the bell crank levers by means of a bolt passing through the upper arms of the shackle and the slots in the inner ends of the bell crank levers. The combined shackle and hook may be replaced by a simple hook having an eye at its upper end.

The invention is illustrated by the accompanying drawings. Part of these drawings show the hereinbefore described self-sustaining lower pulley block as being used in conjunction with an upper pulley block provided with pulleys adapted to coact with one another through the medium of a free wheel device.

Figure 4:
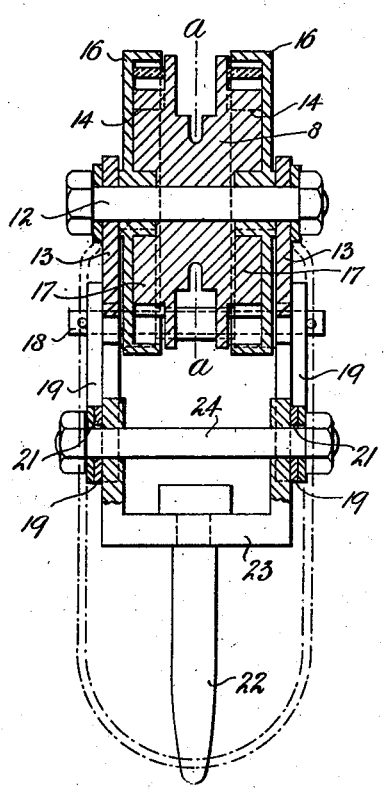
Figure 3:
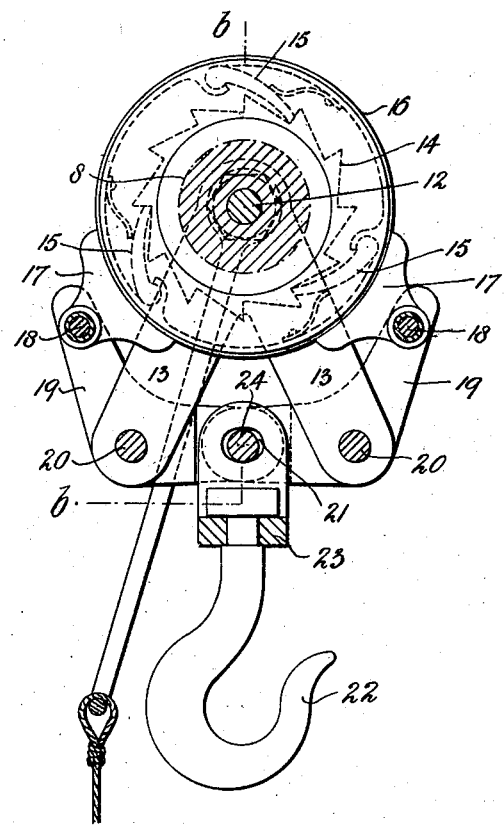
Figure 5:
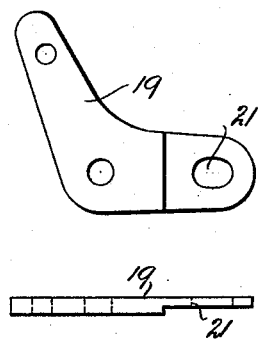
Figure 6:
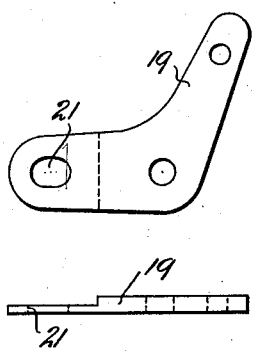

Of these drawings Figure 1 is an elevation and Fig. 2 is a side view, partly in section, illustrating the use of the present invention with an upper pulley block constructed in the manner above referred to. Fig. 3 is a section taken on the line *a—a* of Fig. 4, on an enlarged scale, of the improved lower pulley block, and Fig. 4 is a vertical section of Fig. 3 taken on the line *b—b*. Figs. 5 and 6 are detail views of the bell crank levers above referred to.

Referring first to the upper pulley block the frame 1 of said block is provided with two wheels or pulleys 2 and 3 of different diameters, which pulleys are mounted on a bolt 4 and are adapted to co-act with one another through the medium of a ratchet wheel 5 carried by the wheel 2 and a suitable number of pawls 6 carried by the wheel 3 and engaging with the teeth of the ratchet wheel 5.

7 is an endless chain which is passed in the usual manner obtaining in the case of an ordinary differential pulley apparatus around the wheels 2 and 3 and around a hanging pulley 8 supported in the frame 9 of the lower pulley block.

Referring now to the construction of self-sustaining lower pulley block, the hanging pulley 8, which is loosely mounted on a bolt 12 carried by the frame 13 of the block, is formed with peripheral pockets or is otherwise constructed so as to be gripped by the chain 7 and is provided at its sides with ratchet wheels 14. The ratchet wheels 14 engage with a suitable number of pawls 15 which are carried by wheels 16 mounted loosely on the bolt 12 at the sides of the pulley 8. The outer peripheries of the wheels 16 serve as brake surfaces for blocks 17 which are pivotally mounted by means of pins 18 on the upper and outer ends of bell crank levers 19. The bell crank levers 19 are themselves pivotally supported in the frame 13 by means of bolts 20 and are formed at their inner ends with slots 21. The hook 22 upon which is hung the load or weight which has to be raised or lowered is mounted in a shackle 23, and this shackle 23 is suspended by means of a bolt 24 which is passed through the upper arms of the shackle 23 and the slots 21 in the inner ends of the bell crank lever 19.

From an examination of the drawings it will be seen that when hoisting is being effected the pulley 8 will be free to rotate but said pulley can not turn in the opposite direction when a weight or load is suspended unless a pull is exerted on the lowering side of the chain 7. Further it will be understood that the brake blocks 17 will bear against the peripheries of the brake wheels 16 with a pressure proportionate to the load or weight suspended from the hook 22.

The ratchet wheels 14 and the pawls 15 constitute a free-wheel device and obviously said wheels and pawls could be replaced by any equivalent device and such substitution comes within the scope of my invention. It will also be obvious that other forms of brake blocks could be used.

I wish it to be understood that although I have in the preceding specification and in the following claims, when speaking of the pulley blocks, used the terms upper and lower the blocks might be place otherwise than immediately under one another and such alterations in the arrangement of the blocks come within the scope of my invention.

Having now particularly described and ascertained my invention, what I have invented and desire to secure by Letters Patent of the United States is:—

1. A self-sustaining lower pulley block for differential hoisting and lowering apparatus comprising a hanging pulley rotatably supported within the frame of the block and formed with peripheral surfaces adapted to be gripped by the chain of the apparatus, loosely mounted brake wheels located at the sides of said hanging pulley and operatively connected to the latter by means of a free-wheel device and brake blocks adapted to be forced against the brake wheels by the weight of the load, substantially as described.

2. A self-sustaining lower pulley block for differential hoisting and lowering apparatus consisting of a frame, a pulley loosely mounted on a bolt, formed with pockets for the chain of the apparatus and provided at its sides with ratchet wheels, brake wheels loosely mounted on said bolt at the sides of said pulley and provided with pawls adapted to engage with said ratchet wheels, bell crank levers pivoted to the frame of the block and formed at their inner ends with slots, brake blocks pivoted to the outer ends of said bell crank levers, a hanging hook mounted in a shackle, and a bolt passing through the upper arms of said shackle and the slots formed in the inner ends of the bell crank levers, substantially as described.

In testimony whereof I have affixed my signature in presence of two witnesses.

LOUIS TABULO.

Witnesses:
ARTHUR F. ENNIS,
H. D. JAMESON.